United States Patent [19]  
Angstadt et al.

[11] 3,901,900  
[45] Aug. 26, 1975

[54] PROCESS FOR VAPOR PHASE AMMOXIDATION

[75] Inventors: Howard P. Angstadt, Media; Carl H. Blackburn, Ridley Park, both of Pa.

[73] Assignee: Sun Research and Development Co., Philadelphia, Pa.

[22] Filed: Oct. 1, 1971

[21] Appl. No.: 185,883

Related U.S. Application Data

[63] Continuation-in-part of Ser. No. 92,173, Nov. 23, 1970, abandoned.

[52] U.S. Cl. ..................... 260/294.9; 260/346.1 R
[51] Int. Cl. ............................................. C07d 31/46
[58] Field of Search .......... 260/294.9, 346.1, 465 C, 260/465 H, 465.3

[56] References Cited
UNITED STATES PATENTS

| | | | |
|---|---|---|---|
| 2,496,660 | 2/1950 | Denton et al. | 260/465 |
| 2,496,661 | 2/1950 | Denton | 260/329 |
| 2,838,558 | 6/1958 | Hadley et al. | 260/465 |
| 3,029,245 | 4/1962 | Aries | 260/294.9 |

FOREIGN PATENTS OR APPLICATIONS

| | | | |
|---|---|---|---|
| 809,704 | 4/1959 | United Kingdom | 260/465 |

*Primary Examiner*—G. Thomas Todd  
*Attorney, Agent, or Firm*—George L. Church; Donald R. Johnson; Paul Lipsitz

[57] ABSTRACT

In the vapor phase ammoxidation of organic compounds to form nitriles where a reactant stream of ammonia and organic reactant is passed over catalyst, the improvement which comprises pretreating the catalyst with the organic reactant before admitting the reactant stream to the reactant system, whereby the conversion to nitriles is significantly increased.

5 Claims, No Drawings

PROCESS FOR VAPOR PHASE AMMOXIDATION

RELATED APPLICATION

This application is a continuation-in-part of Ser. No. 92, 173 filed Nov. 23, 1970, and now abandoned.

The vapor phase ammoxidation of organic compounds to nitriles is well known and is exemplified by U.S. Pat. No. 2,463,457 (Denton, assigned to Socony-Vacuum Oil Co., issued Mar. 1, 1949) and by U.S. Pat. No. 2,496,661 (Denton, assigned to Socony-Vaccum Oil Co., issued Feb. 7, 1950). This process is particularly useful for preparing nitriles of aromatic hydrocarbons, as for example, conversion of toluene to benzonitrile, xylenes to toluonitriles and phthalonitriles, and the like, and is also of value generally for converting alkyl substituted aliphatic, aromatic, alicyclic, and heterocyclic compounds to the corresponding nitriles.

In carrying out the process a catalyst is used and a preferred catalyst may be an oxide, salt, or acid of vanadium, molybdenum, tungsten or their mixture (see, for example, U.S. Pat. No. 2,496,661). In starting up the process the art teaches that the catalyst must be conditioned in order to have initial maximum catalytic efficiency and this is done by exposing it to ammonia, hydrogen, or both for a period of time, usually several minutes to several hours. Then, the process is started by passing the reactant stream composed of organic reactant, ammonia, and oxygen over the catalyst under reaction conditions. In some ammoxidation processes, oxygen is omitted from the reactant stream, but is provided in-situ by the high oxidation state oxide catalyst.

It has now been found, however, that in the vapor phase ammoxidation of alkyl substituted organic compounds, the conversion and selectivity to nitrile product can be very significantly increased and this is accomplished in accord with this invention, by pretreating the catalyst with the organic reactant before admitting the reactant stream to the reaction system.

Another particular advantage of the process resides in its application to polyalkyl-substituted aromatic hydrocarbons. In such previously known processes, where the hydrocarbon reactant is a polyalkyl-substituted aromatic hydrocarbon the product obtained is a mixture of mono- and polynitriles where the mono-nitrile is present to a large extent. Thus, if polynitrile products are desired, a significant portion of the mono-nitrile must be recycled to the ammoxidation reactor for conversion to the polynitrile. The process of this invention, however, enables a larger proportion of polynitrile to be obtained than previously experienced.

In carrying out the process of the invention, the reactor and attendant equipment is prepared in the usual way, the reactor being charged with catalyst and otherwise prepared for start-up. The hydrocarbon to be reacted is then passed over the catalyst at reaction conditions which will be about 300° to about 600°C. and at pressures ranging from atmospheric to about 100 p.s.i.g. Preferred treatment conditions will be about 400° to about 450°C. at essentially atmospheric pressure. It is generally desirable to dilute the organic reactant with an inert gas such as helium, nitrogen, etc., but in order that catalyst conditioning be conducted in a reasonable time, the concentration of organic reactant in the mixture should be at least 1 to about 10% by volume.

The process of the invention, of course, is condusive to a continuously operating plant where recycle streams are employed. In such a plant several alternative procedures for catalyst pretreatment are possible. For example, in one technique the catalyst may first be contacted with intermediate products, e.g. with cyanotoluene where a phthalonitrile is the final product, and then followed by contact with hydrocarbon (e.g., xylene) and then lead in the ammonia. In another procedure, the catalyst may be contacted with a fresh hydrocarbon feed stream (xylene) followed by recycle intermediate product (cyanotoluene) and then lead in the ammonia. In still another technique, the recycle intermediate stream (cyanotoluene) and make-up hydrocarbon (xylene) may be premixed before contacting the catalyst and then leading in the ammonia. Any one of these techniques will make the preconditioning of the catalyst operable on a continuous basis in the recycle streams of partially ammoxidized hydrocarbons.

It is to be understood that the ammoxidation reaction conditions will not be changed in any way from those normally used as disclosed in the numerous well known patent and literature references, including the patents mentioned above. It will also be understood that the process of the invention applies to both fresh and regenerated catalyst, regeneration of catalyst being conducted in the usual manner by passing oxygen (from air or other source) over it at elevated temperature. Likewise, the process is applicable to fixed bed and fluidized bed systems of operation. Preferred catalyst systems will be the numerous well-known ammoxidation catalysts such as the oxides of molybdenum, vanadium, tungsten, and the like. Also, other materials such as uranyl molybdate, iron, lead, sodium, and copper molybdates and mixed catalysts may also be used.

The organic reactants useful in the process may be selected from a wide variety of compounds and will include alkyl substituted aromatic, aliphatic, alicyclic, and heterocyclic compounds. Among preferred starting materials are the mono- and polyalkyl-substituted aromatic hydrocarbons such as toluene, the xylenes, $\alpha$-methylnaphthalene, polymethylnaphthalenes, monoalkyl and polyalkylanthracenes, mesitylene, durene, and the like. The alkyl substituent may, of course, contain more than a single carbon atom and thus the corresponding ethyl and other lower alkyl substituents are also useful.

Aliphatic compounds normally subjected to ammoxidation include the olefinic compounds. Thus, any olefinic hydrocarbon having at least one alkyl group is useful in the process. Examples of such compounds are propylene, butenes, octenes, methyl heptenes, alkylbutadienes, pentadienes, ethyl butenes, hexadienes, heptadienes, and the like, all of which will give the corresponding nitriles. Preferred olefins are those containing up to about ten carbon atoms, particularly propylene, butenes, and the methyl-butadienes and cycloolefinic compounds, particularly the alkyl substituted hydrocarbon olefins exemplified by 3-methyl cyclohexene, 3,6-dimethyl cyclohexene, methyl tetralin, and the like.

Also of value as reactants are alicyclic compounds having an alkyl substituent and these compounds are exemplified by methylcyclopentane, methylcyclohexane, the alkyl substituted decalins, and the like.

The heterocyclic compounds useful as organic reactants in the process will include alkyl substituted furans, pyrroles, indoles, thiophenes, pyrazoles, imidazoles, thiazoles, oxazoles, pyrans, pyridines, quinolines, isoquinolines, pyrimidines, pyridazines, pyrazines, and the like, all of which are converted to the corresponding nitriles. Preferred reactants in this group are the mono-, di-, and tri-alkyl pyridines.

In order to more fully describe and illustrate the invention the following examples are given.

EXAMPLE 1

A. Using a catalyst of 10% by weight $V_2O_5$ on alumina, a vapor phase ammoxidation of m-xylene is carried out at 400° to 450°C. by passing over the catalyst a stream of ammonia and m-xylene in an $NH_3$ to m-xylene mole ratio of 9:1. The catalyst is conditioned by passing ammonia over it for about 1 minute before the reactant stream of ammonia and m-xylene is passed over it. Analysis of the product after 15 minutes shows that it contains by weight, 66% m-xylene (m-X), 25.3% m-toluonitrile (m-TN) and 8.2% isophthalonitrile (IPN).

B. The above experiment is repeated except that the regenerated catalyst is first conditioned by passing m-xylene in admixture with helium over it for about 1 minute. Analysis of the product after 15 minutes shows by weight, 21.3% m-X, 22.9% m-TN, and 50.3% IPN.

It is clear from the above data that the product distribution of m-toluonitrile and isophthalonitrile is drastically changed by the process of the invention and that by using the process of the invention the polynitrile (IPN) is the major product.

EXAMPLE 2

Following the essential details of the above examples p-xylene is subjected to ammoxidation over a catalyst of 10% by weight $V_2O_5$ on alumina. When the catalyst is pretreated with ammonia in the usual way, the product after 20 minutes of operation consists of, on a weight basis, 42.5% p-xylene, 3.0% benzonitrile, 33.4% p-toluonitrile (p-TN), and 21.2% terephthalonitrile (TPN). Conversion is 58%.

On the other hand, when the above reaction is run by first treating the catalyst with the p-xylene, the product after 20 minutes contains 17.9% p-xylene, 6.8% benzonitrile, 29.9% p-TN, and 45.4% TPN, with a conversion of 82%.

EXAMPLE 3

In accord with the above examples, p-xylene is subjected to ammoxidation over a Fe-Cr catalyst (Cyanamide catalyst No. 1631). When the catalyst is pretreated with ammonia the product after 20 minutes contains 57.1% p-xylene, 9.0% benzonitrile, 26.1% p-TN and 6.2% TPN. Conversion is 42.9%.

When the catalyst is pretreated with the p-xylene, however, the product after 20 minutes contains 23.4% p-xylene 23.2% benzonitrile, 45.6% p-TN, 7.8% TPN, and conversion is 76.6%.

EXAMPLE 4

Mesitylene is subjected to ammoxidation over a 10% $V_2O_5$ on alumina catalyst as in Example 2. When the catalyst is pretreated with ammonia in the usual way, product distribution after 20 minutes is 2.2% unknown material, 23.1% $C_6H_3(CH_3)_2CN$, 1.8% $C_6H_5(CH_3)(CN)_2$, and 4.2% $C_6H_3(CN)_3$.

On pretreatment with mesitylene in accord with the process of this invention, however, product distribution after 20 minutes is 3.1% unknown, 25.6% $C_6H_3(CH_3)_2CN$, 3.4% $C_6H_3(CH_3)(CN)_2$, and 6.5% $C_6H_3(CN)_3$. Thus, more di- and tri-cyano derivative is made under the conditions of the invention.

EXAMPLE 5 (S-70-249)

Following the details of Example 1 using a catalyst of 20% $V_2O_5$ on silica-alumina toluene is converted to benzonitrile at 450°C. When the catalyst is given the usual ammonia pretreatment the benzonitrile yield is 63.8%. With a toluene pretreatment, however, benzonitrile yield is 94.6%.

EXAMPLE 6 (S-70-249)

α-Methylnaphthalene is subjected to an ammoxidation reaction over a catalyst consisting of 20% $V_2O_5$ on silicaalumina at 450°C. as described in Example 1B. The average composition of the effluent stream from the reactor during the first 20 minutes of operation is: unreacted α-methylnaphthalene 1.5%, unknown material 6.7%, α-cyanonaphthalene 91.5%. After 40 minutes on stream the product stream contains 8.5% unreacted α-methylnaphthalene, 1.1% unknown material, and 90.2% α-cyanonaphthalene. After one hour of operation, the cyanonaphthalene is still over 80% of the product stream.

When this ammoxidation is carried out by treating the catalyst with ammonia prior to admitting the hydrocarbon, the initial conversion of the α-methylnaphthalene is less than 90%, the amount of cyanonaphthalene in the product stream is reduced, and its concentration falls off rapidly so that after one hour of operation it is less than 50% of the product stream.

EXAMPLE 7

Methylcyclohexane is subjected to an ammoxidation procedure as described previously using a catalyst containing 80% $V_2O_5$ on silica. When this catalyst is subjected to an ammonia pretreatment prior to exposure to the hydrocarbon reactant, the product stream after 20 minutes on stream contains 51% unreacted hydrocarbon, 32% methylcyclohexene and 17% cyanobenzene. A similar reaction in which the catalyst was pretreated with methylcyclohexane prior to conducting the ammoxidation reaction gave a product stream containing 32% unreacted hydrocarbon, 18% methylcyclohexene and 40% cyanobenzene.

EXAMPLE 8

When 4-methylpyridine is subjected to ammoxidation conditions similar to those set forth in Example 7, 4-cyanopyridine is produced in an amount of 46% of the reactor effluent stream after 20 minutes on stream, the remainder being unreacted methylpyridine.

Prior treatment of the catalyst with ammonia results in considerably lower conversions of the methylpyridine to cyanopyridine.

EXAMPLE 9

When ethylbenzene is subjected to ammoxidation conditions similar to those described in Example 6, the ethylbenzene is 99+% converted to benzonitrile after 20 minutes on stream. Carrying out the same reaction, but pretreating the catalyst with ammonia results in significantly lower conversion to the desired benzonitrile.

EXAMPLE 10

When carrying out an ammoxidation of 2,6-dimethylnaphthalene according to the procedure described in Example 6, the only product recovered from the reactor effluent stream during the first 20 minutes on stream is 2,6-dicyanonaphthalene. After one hour on stream conversion of the starting dimethylnaphthalene remains at 98 with 80% of that converted being 2,6-dicyanonaphthalene. When carried out by pretreating the catalyst with ammonia, both conversion and selectivity for dinitrile product decreased significantly.

EXAMPLE 11

When Example 10 is repeated except that 2,7-dimethylnaphthalene is used instead of the 2,6-isomer, conversion to the 2,7-dicyanonaphthalene remains at 89% after one hour on stream with conversion to dinitrile after one hour being 59%. Significantly less conversion to dinitrile is obtained when the catalyst pretreatment is made with ammonia.

EXAMPLE 12

1,5-Dimethylnaphthalene is ammoxidized, in accord with the conditions of Example 1B with a catalyst consisting of a physical mixture of $V_2O_5$, $Al_2O_3$ and $SiO_2$ such that $V_2O_5$ comprised 20 weight % of the total oxides present. After 20 minutes on stream the product obtained contains 28.98% unreacted 1,5-dimethylnaphthalene, 22.56% monocyanomonoethylnaphthalene, 2.93% unknown material and 44.82% 1,5-dicyanonaphthalene.

EXAMPLE 13

Using the catalyst and procedure of Example 6, 1,5-dimethyltetralin is ammoxidized with results similar to those obtained in Example 12.

EXAMPLE 14

Using the catalyst and procedure of Example 6, pseudocumene is ammoxidized to provide after 20 minutes on stream 98% conversion of the starting trialkylbenzene, 14.5% monocyano-dimethylbenzene, 15.6% dicyano-monoethylbenzene, and 42.5% tricyanobenzene. Carrying out this reaction with an ammonia pretreatment of the catalyst results in lower conversions and lower amounts of polycyano products.

EXAMPLE 15

Following the details of Example 8, 2-methylfuran is converted to 2-cyanofuran.

EXAMPLE 16

Following the details of Example 7, 3-methylcyclohexene is converted to cyanobenzene in good yield.

EXAMPLE 17

Following the details of Example 6, durene is ammoxidized to yield the corresponding tetrocyanobenzene and the yield of tetrocyanobenzene is higher with the hydrocarbon pretreatment of catalyst than with the ammonia pretreatment.

The invention claimed is:

1. In the vapor phase ammoxidation process of an organic reactant to form nitriles where a reactant stream consisting essentially of ammonia and a heterocyclic organic reactant is passed over catalyst, the improvement which comprises pretreating the catalyst with vapors consisting of an inert gas and at least 1% to about 10% by volume of the organic reactant at reaction conditions before admitting the reactant stream to the reaction system.

2. The process of claim 1 where the heterocyclic compound is an alkylpryidine.

3. The process of claim 1 where the heterocyclic compound is 4-methylpyridine.

4. The process of claim 1 where the heterocyclic compound is an alkyl-substituted furan.

5. The process of claim 1 where the heterocyclic compound is 2-methylfuran.

* * * * *